United States Patent [19]

Tamura

[11] Patent Number: 4,663,375

[45] Date of Patent: May 5, 1987

[54] PROCESS FOR PRODUCING HEAT-RESISTING MOLDINGS

[75] Inventor: Yutaka Tamura, Ibaraki, Japan

[73] Assignee: Mitsubishi Petrochemical Co., Ltd., Tokyo, Japan

[21] Appl. No.: 732,599

[22] Filed: May 10, 1985

[30] Foreign Application Priority Data

| May 15, 1984 | [JP] | Japan | 59-97185 |
| May 18, 1984 | [JP] | Japan | 59-100103 |
| May 25, 1984 | [JP] | Japan | 59-106025 |
| May 25, 1984 | [JP] | Japan | 59-106026 |
| May 28, 1984 | [JP] | Japan | 59-108139 |
| Jun. 5, 1984 | [JP] | Japan | 59-114822 |

[51] Int. Cl.$^4$ .................. C08K 5/41; C08K 5/20
[52] U.S. Cl. .................. 524/171; 524/218; 524/219; 524/220; 524/225; 524/276; 524/228; 524/230; 524/232; 524/294; 524/296; 264/211; 264/328.16
[58] Field of Search ........ 524/226, 228, 220, 225, 524/218, 219, 225, 230, 232, 171, 294, 296, 158, 167, 171, 217, 221, 223, 227, 229, 206; 264/211, 328.16

[56] References Cited

U.S. PATENT DOCUMENTS

| 2,758,982 | 8/1956 | Wicklatz et al. | 524/230 |
| 2,948,698 | 8/1960 | Cocci | 524/230 |
| 3,186,961 | 6/1965 | Sears | 524/611 |
| 3,207,736 | 9/1965 | Wijga | 524/294 |
| 3,274,144 | 9/1966 | Keskkula et al. | 524/227 |
| 3,386,795 | 6/1968 | Caldwell et al. | 264/211 |
| 3,398,175 | 7/1968 | Baitinger | 524/217 |
| 3,420,792 | 1/1969 | Zuccaro | 524/611 |
| 3,557,031 | 1/1971 | Standish et al. | 524/230 |
| 3,649,585 | 3/1972 | Foelsch et al. | 524/228 |
| 3,660,557 | 5/1972 | Smith et al. | 264/211 |
| 3,751,388 | 8/1973 | Tabana et al. | 524/227 |
| 3,796,775 | 3/1974 | Glaser et al. | 524/228 |
| 3,801,530 | 4/1974 | Freed | 524/230 |
| 3,846,391 | 11/1974 | Powell | 524/228 |
| 3,935,143 | 1/1976 | Takahashi et al. | 524/228 |
| 4,119,603 | 10/1978 | Holub et al. | 524/230 |
| 4,352,904 | 10/1982 | Deyrup | 524/230 |
| 4,430,289 | 2/1984 | McKinney et al. | 264/211 |
| 4,500,665 | 2/1985 | Brecker et al. | 524/227 |
| 4,530,952 | 7/1985 | Tayama et al. | 524/611 |

FOREIGN PATENT DOCUMENTS

115218A2 8/1984 European Pat. Off. .
124950 7/1984 Japan .

OTHER PUBLICATIONS

L. Mascia: *The Role of Additives in Plastics,* 32 to 37 and 52 to 64, 1974.

*Primary Examiner*—Veronica P. Hoke
*Attorney, Agent, or Firm*—Oblon, Fisher, Spivak, McClelland & Maier

[57] ABSTRACT

A process for producing a thermoplastic resin molding which comprises adding to a thermoplastic resin an organic compound which is compatible with said thermoplastic resin to form a homogeneous phase at a molten state of said thermoplastic resin and causes phase separation by cooling, molding the composition by melting, and solidifying it by cooling; and the molding thus obtained.

16 Claims, No Drawings

PROCESS FOR PRODUCING HEAT-RESISTING MOLDINGS

FIELD OF THE INVENTION

The present invention relates to a process for producing thermoplastic resin moldings and, particularly, to a process for producing thermoplastic resin moldings having good heat resistance.

BACKGROUND OF THE INVENTION

Thermoplastic resins have a feature that they are plasticized and can be easily molded when they are heated to a temperature higher than the melting point or glass transition temperature of them. The reason of having many wide uses as compared with thermosetting resins is greatly due to the good shaping property or molding property.

However, in recent years, further improvement of molding property of the thermoplastic resins is required in the market and the improvement of molding property is an important problem in this field of the art.

One of reasons why widely used resins represented by polyolefins such as polyethylene, polypropylene, etc., styrene resins such as polystyrene, high impact polystyrene or styrene-acrylonitrile-butadiene copolymer, vinyl chloride resins and acryl resins can be used in great quantities and in wide uses is that they have good molding property and be easily shaped in addition to their performances.

In the field of widely used resins having such comparatively good molding property, further improvement of molding property has been required in recent years because of various uses. For example, production of moldings having a large size, a thin thickness or a complicated shape is a requirement of the age and, in any case, it is necessary to improve fluid property (improvement of molding property) of the resins.

Further, polyamide, polyoxymethylene, polyester (polybutylene terephthalate, polyethylene terephthalate, etc.), polycarbonate, polyphenylene ether, modified polyphenylene ether, polyarylate, polysulfone, polyether sulfone, polyphenylene sulfide, polyether ether ketone, etc. have been widely used as raw materials instead of metals, because of having strength and heat resistance, and use of them extends in the field of machinery components, parts for cars, parts for electric and electronic devices, etc. as engineering plastics.

Since these engineering plastics have high strength and high heat resistance but have a high melting point and a high melt viscosity, a high molding temperature and a high molding pressure are frequently required upon carrying out mold processing. Therefore, improvement of molding property is greatly required as compared with the case of widely used plastics.

As a technique of improving molding property of thes thermoplastic resins, a process in which intermolecular cohesive force of polymer is reduced by the following procedures is generally used.

(1) The polymer is modified by copolymerizing with a monomer having low polarity, in order to lower the polarity of the polymer.
(2) Internal plasticization is accelerated by making branches in the polymer.
(3) Degree of polymerization of the polymer is reduced.
(4) Polymer having high fluidity such as low molecular weight polyethylene, ethylene-vinyl acetate copolymer, etc. is added.
(5) A plasticizer is added.

However, in these procedures, there are still many problems of requiring improvement, which are important technical subjects. For example, in procedures (1) and (2), inherent characteristics (for example, heat resistance) of the resin are frequently damaged by modification such as by copolymerization, etc. In procedures (3) and (4), mechanical strength of the polymer is frequently reduced. In procedure (5), molding property (fluidity) is improved at the sacrifice of heat resistance of the polymer.

The present inventors have thought that the systme is preferred to be in the following state in order to produce moldings in which reduction of mechanical strength and deterioration of heat resistance are prevented, in an excellent state of molding.

(1) In case of molding, namely, in a fluidized state of system, a fluidity improving agent becomes compatible with matrix components to show an effect of improving fluidity similar to plasticizers.
(2) In case of using the molding, namely, in a state of stopping of fluidization [temperature range of lower than crystal melting point or Tg (glass transmission temperature) of the matrix], the fluidity improving agent causes phase separation from the matrix components and does not reduce Tg of the matrix.

As a result of studies in the above described viewpoint, a technique of using the following diamide compounds has been developed and filed already (Japanese Patent Application (OPI) No. 124950/84, U.S. Pat. No. 4,350,952 issued July 23, 1985, European Patent Application No. 88308004.7).

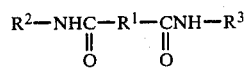

wherein $R^1$, $R^2$ and $R^3$ each represents a saturated or unsaturated straight chain or branched chain hydrocarbon residue having from 1 to 10 carbon atoms, an alicyclic hydrocarbon residue, an aromatic hydrocarbon residue, or a residue of derivatives of them.

The present invention has been attained by further developing the above described technique.

SUMMARY OF THE INVENTION

The present invention provides a process for producing thermoplastic resin moldings which comprises heating a composition containing a thermoplastic resin material and an organic compound which is compatible with said resin material to form a homogeneous phase in a molten state of said resin material and causes phase separation by cooling to a solidified state, to form a melting state of the resin, thereafter molding it and cooling to separate said organic compound in a state of fine particles, by which molding property of the thermoplastic resin is improved, moldings having a large size or moldings having a thin thickness can be molded and thermoplastic resin moldings having excellent heat resistance and good surface luster can be produced.

DETAILED DESCRIPTION OF THE INVENTION

(1) Thermoplastic resin

In the present invention, many thermoplastic resins can be utilized.

Examples of thermoplastic resins include polyolefins such as polyethylene or polypropylene, polystyrene, high impact polystyrene, styrene copolymers [ABS resin (i.e., acrylonitrile-butadiene-styrene copolymer) etc.], polyvinyl chloride, polyvinylidene chloride, polymethacrylic acid esters, polyacrylic acid derivatives, polyacrylonitrile, polyamides such as nylon 6 nylon 6,6, etc., polyesters such as polyethylene terephthalate, polybutylene terephthalate, etc., polycarbonate, polynorbornene resin, polyphenylene ether, polyarylate, polysulfone, polyphenylene sulfide, polyether sulfone, polyfluoroethylene, etc. and modified polymers thereof, for example, chlorinate polyethylene, polycarbonate grafted with styrene, etc.

Blends of these thermoplastic resins (polymer alloys) can be of course utilized. For example, a blend of polyphenylene ether and polystyrene, a blend of polycarbonate and polystyrene, a blend of polycarbonate and polyester, a blend of ABS resin and polyvinyl chloride, and a blend of polycarbonate and vinyl chloride polymer.

The present invention is preferred to apply to amorphous thermoplastic resins.

In the present invention, amorphous resin means an amorphous thermoplastic high polymer having a crystallinity of 20% or less measured by X-ray diffraction under an ordinary condition of use.

For example, it is possible to use thermoplastic resins such as polystyrene, high impact polystyrene, styrene copolymers (ABS resin, etc.), polyvinyl chloride, polymethacrylic acid esters, polyacrylic acid derivatives, polycarbonate, polynorbornene resin, polyarylate, polysulfone, polyether sulfone, polyphenylene ether, etc. and modified polymers thereof, such as polycarbonate grafted with styrene, etc.

Preferably, amorphous thermoplastic resins having a glass transition temperature of 100° C. or more, preferably, 120° C. or more are used.

Particularly, polyphenylene ethers are preferred.

Polyphenylene ethers used in the present invention have a repeating structural unit represented by the general formula

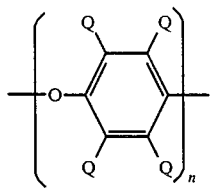

wherein the ether oxygen atom in the unit bonds to a benzene ring in the adjacent unit, n is at least 50, and Q represents a monovalent substituent selected from the group consisting of hydrogen, halogen, hydrocarbon groups having no tertiary α-carbon atom, halogenated hydrocarbon groups having at least 2 carbon atoms between the halogen atom and the phenyl nucleus, hydrocarbon oxy groups and halogenated hydrocarbon oxy groups having at least 2 carbon atoms between the halogen atom and the phenyl group.

Typical examples of polyphenylene ethers include poly(2,6-dimethyl-1,4-phenylene)ether, poly(2,6-diethyl-1,4-phenylene)ether, poly(2-methyl-6-ethyl-1,4-phenylene)ether, poly(2-methyl-6-propyl-1,4-phenylene)ether, poly(2,6-dipropyl-1,4-phenylene)ether, poly(2-ethyl-6-propyl-1,4-phenylene)ether, poly(2,6-dibutyl-1,4-phenylene)ether, poly(2,6-dipropenyl-1,4-phenylene)ether, poly(2,6-dilauryl-1,4-phenylene)ether, poly(2,6-diphenyl-1,4-phenylene)ether, poly(2,6-dimethoxy-1,4-phenylene)ether, poly(2,6-diethoxy-1,4-phenylene)ether, poly(2-methoxy-6-ethoxy-1,4-phenylene)ether, poly(2-ethyl-6-stearyloxy-1,4-phenylene)ether, poly(2,6-dichloro-1,4-phenylene)ether, poly(2-methyl-6-phenyl-1,4-phenylene)ether, poly(2,6-dibenzyl-1,4-phenylene)ether, poly(2-ethoxy-1,4-phenylene)ether, poly(2-chloro-1,4-phenylene)ether, poly(2,5-dibromo-1,4-phenylene)ether and analogues.

In addition, there are copolymers such as copolymer of 2,6-dimethylphenol and 2,3,6-trimethylphenol, copolymer of 2,6-dimethylphenol and 2,3,5,6-tetramethylphenol, copolymer of 2,6-diethylphenol and 2,3,6-trimethylphenol, etc.

Furthermore, the polyphenylene ethers used in the present invention include modified polyphenylene ethers, for example, graft polymer obtained by grafting styrene monomer (for example, styrene, p-methylstyrene, α-methylstyrene, etc.) to polyphenylene ether represented by the above described general formula.

Styrene resins may be added to the above described polyphenylene ethers. As styrene resins, there are homopolymers such as polystyrene, poly-α-methylstyrene, poly-p-methylstyrene, etc., high impact polystyrene modified with various rubbers such as butadiene rubber, styrene-butadiene copolymer, ethylene-propylene ethylene-propylene-diene terpolymer, etcl, styrene-butadiene copolymer, styrene-maleic acid anhydride copolymer, styrene-acrylonitrile copolymer, styrene-acrylonitrile-butadiene copolymer, styrene-methyl methacrylate copolymer, etc. These styrene resins are blended in a rate of 0 to 2000 parts by weight, preferably 0 to 1000 parts by weight, more preferably 10 to 500 parts by weight based on 100 parts by weight of the polyphenylene ether resins.

In order to improve impact resistance, etc., othe polymers can be added to polyphenylene ethers or compositions of polyphenylene ether and styrene resin.

As polymers added, there are natural and synthetic elastic polymers. For example, natural rubber, polyisoprene, polybutadiene, copolymer (including block copolymer) of styrene and conjugated diene such as butadiene, ethylene-propylene copolymer, ethylene-propylene-nonconjugated diene terpolymer, etc. can be used.

As other polymers, polyolefins grafted on polyphenylene ether or styrene resin can be used.

(2) Fluidity improving agent

The organic compound used as a fluidity improving agent in the present invention has compatibility with the thermoplastic resin in a molten state of said resin and forms a homogeneous phase, and it causes phase separation in a solidified state of the resin by cooling the composition by which the compound is phase separated and dispersed in the composition as very fine particles.

In the present invention, the term "molten state" means a state that the resin has fluidity and is capable of molding. Generally, it means a state of being above the glass transition temperature or crystal melting point. The term "solidified state" means a state of being below the temperature at which molding property is lost. Generally it means a state of being below the crystal melting point or glass transition temperature, typically a temperature of using moldings.

The separated organic compound is preferred to be in a state wherein very fine particles are uniformly dispersed.

Generally, dispersed particles of the organic compound is preferred to have a average diameter of $10\mu$ or less, preferably $5\mu$ or less and, more preferably $3\mu$ to $0.1\mu$, as weight average.

Average particle size can be measured by means of a microanalyzer using a photograph obtained by an electron microscope.

Particle size of the organic compound varies according to relation between the organic compound and the resin phase and the cooling condition.

As the organic compounds which form a homogeneous phase in a molten state of the resin phase and are separated in a solidified state of the resin phase, (a) low molecular compounds having a moiety compatible with matrix component upon molding, namely, in a molten state so as to act as platicizers, (b) compounds which cause phase separation from the matrix by crystallization at a temperature of below the molding temperature (below the glass transition temperature of the matrix), (c) compounds which are desired to have a comparatively strong polarity so as to ensure crystallization at a temperature of below the molding temperature, which have a unit having an affinity for matrix component so as to hold interfacial adhesive strength with the matrix even if phase separation occurs by crystallization, are used.

It is necessary that the organic compound for improving fluidity used in the present invention is compatible with the matrix component in a fluidized state for molding and causes phase separation from the matrix component by crystallization when the molding is used. Accordingly, the organic compound for improving fluidity is desired to have a melting point which is somewhat (preferably at least about 5° C.) lower than the molding temperature. The molding temperature is generally given between the lower limit of the temperature at which flowing of the system begins (glass transition temperature of the matrix or melting point of the crystal) and the upper limit of the temperature at which decomposition of the system begins, and a suitable temperature is given according to the system. Accordingly, a desirable melting point of the organic compound for improving fluidity of the invention (which is somewhat lower than the molding temperature) is generally in a range of 100° C. to 400° C., though it is selected according to the molding temperature of the thermoplastic resin used.

Examples of the organic compounds include the following compounds.

Amide compounds represented by the general formulae:

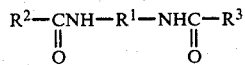

-continued

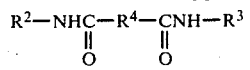

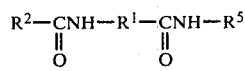

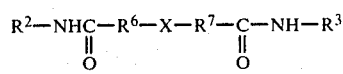

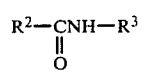

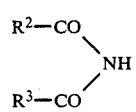

wherein $R_1$ represents a saturated or unsaturated straight chain or branched chain hydrocarbon residue having from 1 to 20 carbon atoms, preferably from 1 to 10 carbon atoms, an alicyclic hydrocarbon residue preferably having from 3 to 20 carbon atoms, an aromatic hydrocarbon residue preferably having from 6 to 20 carbon atoms, or a residue of derivatives containing the above described residues, $R^2$ and $R^3$ each represents a saturated or unsaturated straight chain or branched chain hydrocarbon residue having from 1 to 10 carbon atoms, an alicyclic hydrocarbon residue preferably having from 3 to 10 carbon atoms, an aromatic hydrocarbon residue preferably having from 6 to 10 carbon atoms, or a residue of derivatives of them, $R_4$ represents a saturated or unsaturated straight chain or branched chain hydrocarbon residue having 11 to 20 carbon atoms, an alicyclic hydrocarbon residue preferably having from 11 to 20 carbon atoms, an aromatic hydrocarbon residue preferably having from 11 to 20 carbon atoms, or a residue of derivatives containing the above described residues, $R_5$ represents a hydrogen atom, a saturated or unsaturated straight chain or branched chain hydrocarbon residue having from 1 to 10 carbon atoms, an alicyclic hydrocarbon residue preferably having from 3 to 10 carbon atoms, an aromatic hydrocarbon residue preferably having from 6 to 10 carbon atoms, or a residue of derivatives of them, $R^6$ and $R^7$ each represents a saturated or unsaturated straight chain or branched chain hydrocarbon residue, an alicyclic hydrocarbon residue preferably having at least 3 carbon atoms, an aromatic hydrocarbon residue, or a residue or derivatives of them, wherein a total of carbon atoms in $R^6$ and $R^7$ is 2 to 10; and —X— represents —O—, —S—, >CO, —COO— or >SO$_2$.

Sulfonamides represented by the general formulae:

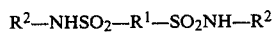

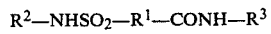

wherein $R^1$, $R^2$ and $R^3$ each represents the same groups as described above.

Cyclic amides, phosphoric acid amides, boric acid amides, and amide oligomers. Compound represented by the following formulae:

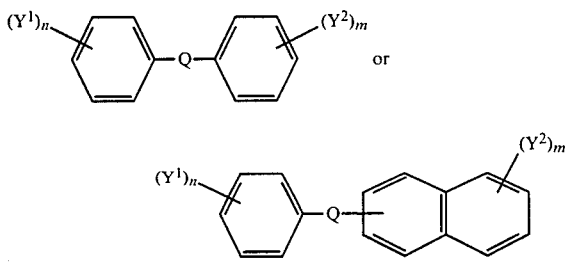

wherein

Q represents a bonding group containing S or S and O, O or O and C, or N or N and H (e.g., —S—, —SO—, —SO$_2$—, —O—, —CO—, —COO—, —NH—, and —NHCO—), $Y^1$ and $Y^2$ each represents a substituent selected from the group consisting of
- —$R^8$ ($R^8$: hydrocarbon group having from 1 to 10 carbon atoms),
- —X (X: halogen such as Cl, Br or F),
- —$OR^9$ ($R^9$: H or hydrocarbon group having from 1 to 10 carbon atoms),
- —$NR^{10}R^{11}$ ($R^{10}$ and $R^{11}$: H or hydrocarbon group having from 1 to 10 carbon atoms),
- —$OCOR^{12}$ ($R^{12}$: hydrocarbon group having from 1 to 10 carbon atoms),
- —$COOR^{13}$ ($R^{13}$: H or hydrocarbon group having from 1 to 10 carbon atoms),
- —$COR^{14}$ ($R^{14}$: hydrocarbon group having from 1 to 10 carbon atoms),
- —$SO_2R^{15}$ ($R^{15}$: OH or hydrocarbon group having from 1 to 10 carbon atoms),
- —$NO_2$,
- —NO, and
- —CN;

n represents an integer selected from 1 to 5, and m represents an integer selected from 0 to 5. Substituents ($Y^1$ and $Y^2$) in case of n+m being 2 or more may be identical or different from each other.

Compounds represented by the following formula

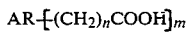

$$AR\text{---}[(CH_2)_n COOH]_m$$

wherein

Ar represents an aromatic hydrocarbon residue having 6 to 20 carbon atoms, or a residue of derivatives obtained by bonding plural aromatic hydrocarbon residues with a linking group, n represents an integer selected from 0 to 6, m represents an integer selected from 1 to 4, in case that m is 2 or more, each n in the chemical formula may be identical or different.

Examples of Ar include a phenyl group, a phenylene group, a benzenetolyl group, a naphthyl group, a naphthylene group, a naphthalenetolyl group, and residues of derivatives obtained by bonding a plurality of the above described groups with, for example, the following linking group.
- —CH$_2$— (methylene group)
- —O— (oxy group)
- —S— (thio group)
- —SO$_2$— (sulfonyl group)
- —CO— (carbonyl group)
- —COO— (carbonyloxy group)

Hydrogens in Ar or —(CH$_2$)— may be substituted by one or more substituents. As the substituents, the same groups as in $Y^1$ and $Y^2$ can be used.

Examples of $R^1$ include a methylene group, an ethylene group, a trimethylene group, a propylene group, a tetramethylene group, an isobutylene group, a pentamethylene group, a cyclopentylene group, a hexamethylene group, a cyclohexylene group, an octamethylene group, a decamethylene group, a phenylene group, a naphthalene group, a biphenylene group, a diphenylenemethane group, Furthermore, $R_1$ includes residues of derivatives obtained by bonding a plurality of the groups defined hereinabove with, for example, the following linking groups. Carbon numbers of these residues are preferably not more than 20.
- —O— (oxy group)
- —S— (thio group)
- —SO$_2$— (sulfonyl group)
- —CO— (carbonyl group)
- —COO— (carbonyloxy group)

Examples of $R^2$ and $R^3$ include a methyl group, an ethyl group, a propyl group, an isopropyl group, a butyl group, an isobutyl group, a t-butyl group, a pentyl group, an isopentyl group, a cyclopentyl group, a hexyl group, an isohexyl group, a cyclohexyl group, a heptyl group, an octyl group, a decyl group a phenyl group, etc. $R^2$ and $R^3$ each may be substituted with a halogen atom or a hydroxy group.

$R^1$, $R^2$ and $R^3$ may have one or more substituents. As the substituents, the same groups as in $Y^1$ and $Y^2$ can be used.

Examples of $R^4$ include a dodecamethylene group, a biphenylene group, a diphenylenemethane group, and residues of derivatives obtained by bonding a plurality of, for example, methylene groups, ethylene groups, trimethylene groups, propylene groups, tetramethylene groups, isobutylene groups, pentamethylene groups, cyclopentylene groups, hexamethylene groups, cyclohexylene groups, octamethylene groups, decamethylene groups, phenylene groups and naphthalene groups, with, for example, the following linking group. $R^4$ may be substituted with a halogen atom or a hydroxy group.
- —O— (oxy group)
- —S— (thio group)
- —SO$_2$— (sulfonyl group)
- —CO— (carbonyl group)
- —COO— (carbonyloxy group)

Examples of $R^5$ include a hydrogen atom and groups cited as examples for $R^2$.

Examples of $R^6$ and $R^7$ include a hydrocarbon residue such as methylene group, ethylene group, trimethylene group, propylene group, tetramethylene group, isobutylene group, pentamethylene group, cyclopentylene group, hexamethylene group, cyclohexylene group, octamethylene group and phenylene group.

Amount of the organic compound to be added is in a range preferably of 0.1 to 25 parts by weight, more preferably 0.5 to 20 parts by weight, most preferably 1 to 10 parts by weight, based on 100 parts by weight of the thermoplastic resin.

(3) Additives, etc.

Generally, various additives are used for the thermoplastic resin according to the purpose of use. For example, there are reinforcing agents such as glass fibers, inorganic fillers, etc., stabilizers, plasticizers, fire retardants, releasing agents, coloring agents, etc.

The present invention can be applied to not only the system composed of only the thermoplastic resin but also the complex system wherein the above described various additives are added.

(4) Molding process.

As molding processes used for practicing the present invention, processes ordinarily used in the field of the art can be used. Generally, an extrusion molding process, an injection molding process and a blow molding process are used.

In order to separate the organic compound from the resin so as to disperse in a state of very fine particles, the molding obtained by shaping is cooled.

In some organic compounds, separation is rapidly carried out and the organic compound can be separated out by cooling in conventional molding process. However, in some compounds, separation requires a long time.

In such a case, cooling should be carried out over a long time by reducing the cooling rate. Particularly, the temperature should be kept in a range of lower than the melting point of the organic compound and higher than the solidifying temperature of the matrix (glass transition temperature of the matrix or melting point).

It can be carried out by heat treatment of the resulted molding at a temperature slightly (preferably about 5° C.) higher than the solidifying temperature of the matrix.

In the following, the present invention is illustrated in detail with reference to examples.

EXAMPLE 1

100 parts by weight of a polymer alloy composed of 60:40 parts by weight of poly-2,6-dimethyl-1,4-phenylene ether (produced by Mitsubishi Petro-Chemical Co., intrinsic viscosity in chloroform at 25° C.: 0.50) and polystyrene (produced by Mitsubishi Monsanto Chemical Co.; HF-77), and 5 parts by weight of N,N'-diheptanoyl-p-phenylenediamine represented by the following structural formula:

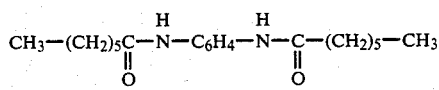

(melting point measured by a melting point tester MP-1 type (trade mark: produced by Yamato Kagaku Co.): 210° C.) were kneaded by melting at 250° C. for 8 minutes by means of a Brabender plastomill.

After completion of kneading, melt index (250° C., load of 10 Kg) which showed molding property (fluidity) was measured.

The mixture was put in a mold having a temperature of 250° C., of a press molding apparatus. After it was pre-heated for 8 minutes, cooling was initiated. When the temperature of the mold became 220° C., molding was carried out by applying a pressure of 100 kg/cm², while cooling was continued. After it was cooled to 50° C. over 10 minutes, the press was opened and the molding was taken out.

Thermal transformation temperature of the resulting molding was measured (ASTM D-648, load: 18.6 kg/cm²).

A result of observation of the compound kept at 250° C. by a phase difference microscope and a result of observation of the molding at room temperature are shown in Table 1.

COMPARATIVE EXAMPLE 1

Results obtained by the same manner as in Example 1 except that N,N'-diheptanoyl-p-phenylenediamine was not used are shown in Table 1.

COMPARATIVE EXAMPLE 2

Results obtained by the same manner as in Example 1 except that 5 parts by weight of the plasticizer: triphenyl phosphate (melting point: 50° C.) were used instead of N,N'-diheptanoyl-p-phenylenediamine are shown in Table 1.

COMPARATIVE EXAMPLE 3

Results obtained by the same manner as in Example 1 except that 5 parts by weight of dipentaerythritol (melting point: 215° C.) which was not compatible with the polymer alloy in case of molding processing were used instead of N,N'-diheptanoyl-p-phenylenediamine are shown in Table 1.

TABLE 1

|  | Organic Compound | Melt index (g/10 min) | Thermal transformation temperature (°C.) | Observation at 250° C. by phase difference microscope | Observation of molding at room temperature |
| --- | --- | --- | --- | --- | --- |
| Example 1 | N,N'—Diheptanoyl-p-phenylenediamine | 12.7 | 124 | Homogeneous phase | Cloudy |
| Comparative Example 1 | Absence | 4.1 | 125 | Homogeneous phase | Transparent |
| Comparative Example 2 | Triphenyl phosphate | 12.3 | 105 | Homogeneous phase | Transparent |
| Comparative Example 3 | Dipentaerythritol | 4.9 | 124 | Inhomogenous phase | Cloudy |

EXAMPLE 2

Using 100 parts by weight of a polymer alloy composed of 50:50 parts by weight of the same polyphenylene ether as in Example 1 and high impact polystyrene (produced by Asahi Dow Co.; trade mark: 475D) and 5 parts by weight of N-phenyl-2-hydroxynaphthoic acid amide (melting point: 243° C.), kneading, molding and evaluation were carried out in the same manner as in Example 1. Results obtained are shown in Table 2.

EXAMPLE 3

Results obtained by the same manner as in Example 2 except that 5 parts by weight of 3,3'-diaminodiphenyl sulfone (melting point: 172° C.) were used instead of N-phenyl-2-hydroxynaphthoic acid amide are shown in Table 2.

EXAMPLE 4

Results obtained by the same manner as in Example 2 except that 5 parts by weight of triethanolamine borate (melting point: 235° C.) were used instead of N-phenyl-2-hydroxynaphthoic acid amide are shown in Table 2.

EXAMPLE 5

Results obtained by the same manner as in Example 2 except that 5 parts by weight of N,N'-di-β-naphthyl-p-phenylenediamine (melting point: 235° C.) were used instead of N-phenyl-2-hydroxynaphthoic acid amide are shown in Table 2.

EXAMPLE 6

Results obtained by the same manner as in Example 2 except that 5 parts by weight of 2-hydroxynaphthoic acid (melting point: 218° C.) were used instead of N-phenyl-2-hydroxynaphthoic acid amide are shown in Table 2.

EXAMPLE 7

Results obtained by the same manner as in Example 2 except that 5 parts by weight of o-benzoic sulfimide (melting point: 226° C.) were used instead of N-phenyl-2-hydroxynaphthoic acid amide are shown in Table 2.

EXAMPLE 8

Results obtained by the same manner as in Example 2 except that 5 parts by weight of 4,4'-dihydroxybenzophenone (melting point: 213° C.) were used instead of N-phenyl-2-hydroxynaphthoic acid amide are shown in Table 2.

COMPARATIVE EXAMPLE 4

Results obtained by the same manner as in Example 2 except that N-phenyl-2-hydroxynaphthoic acid amide was not used are shown in Table 2.

|  | Organic Compound | Melt index (g/10 min) | Thermal transformation temperature (°C.) |
|---|---|---|---|
| Example 2 | N—Phenyl-2-hydroxynaphthoic acid amide | 11.5 | 128 |
| Example 3 | 3,3'-Diaminodiphenyl sulfone | 6.2 | 133 |
| Example 4 | Triethanolamine borate | 5.0 | 134 |
| Example 5 | N,N'—di-β-naphthyl-p-phenylenediamine | 8.7 | 131 |
| Example 6 | 2-Hydroxynaphthoic acid | 10.8 | 125 |
| Example 7 | o-Benzoic sulfimide | 8.2 | 131 |
| Example 8 | 4,4'-Dihydroxybenzophenone | 5.7 | 130 |
| Comparative Example 4 | Absence | 2.6 | 134 |

EXAMPLE 9

100 parts by weight of high impact polystyrene (produced by Mitsubishi Monsanto Chemical Co., trade name: HT-76) and 5 parts by weight of 2,6,7-trioxa-1-phosphobicyclo [2,2,2]-octane-4-ethyl-1-oxide (melting point: 205° C.) were kneaded by melting at 250° C. for 5 minutes by means of a Brabender plastomill.

After completion of kneading, molding and evaluation (melt index at 250° C., load of 5 kg) were carried out by the same manner as in Example 1. Results are shown in Table 3.

COMPARATIVE EXAMPLE 5

Results obtained by the same manner as in Example 9 except that 2,6,7-trioxa-1-phosphobicyclo (2,2,2)octane-4-ethyl-1-oxide was not used are shown in Table 3.

|  | Organic Compound | Melt index (g/10 min) | Thermal transformation temperature (°C.) |
|---|---|---|---|
| Example 9 | 2,6,7-Trioxa-1-phosphobicyclo(2,2,2)-octane-4-ethyl-1-oxide | 75 | 84 |
| Comparative Example 5 | Absence | 33 | 85 |

EXAMPLE 10

100 parts by weight of ABS resin (produced by Ube Industries, Ltd., trade name: Cycolac LM1101) and 5 parts by weight of N-phenyl-2-hydroxynaphthoic acid amide were kneaded by melting for 8 minutes by means of a Brabender plastomill and the mixture was molded by a press molding apparatus at a mold temperature of 280° C. Results obtained are shown in Table 4.

EXAMPLE 11

Results obtained by the same manner as in Example 10 except that 5 parts by weight of N,N'-diheptanoyl-p-phenylenediamine were used instead of N-phenyl-2-hydroxynaphthoic acid amide are shown in Table 4.

COMPARATIVE EXAMPLE 6

Results obtained by the same manner as in Example 10 except that N-phenyl-2-hydroxynaphthoic acid amide was not used are shown in Table 4.

|  | Organic Compound | Melt index (g/10 min) | Thermal transformation temperature (°C.) |
|---|---|---|---|
| Example 10 | N—Phenyl-2-hydroxynaphthoic acid amide | 11.3 | 80 |
| Example 11 | N,N'—Diheptanoyl-p-phenylenediamine | 10.5 | 81 |
| Comparative Example 6 | Absence | 2.8 | 84 |

EXAMPLE 12

Results obtained by the same manner as in Example 10 except that 100 parts by weight of polycarbonate resin (produced by Mitsubishi Gas Chemical Co.; trade name: IUPYLON S-3000) were used instead of ABS rsin are shown in Table 5.

EXAMPLE 13

Results obtained by the same manner as in Example 12 except that 5 parts by weight of N,N'-diheptanoyl-p-phenylenediamine were used instead of N-phenyl-2-hydroxynaphthoic acid amide are shown in Table 5.

COMPARATIVE EXAMPLE 7

Results obtained by the same manner as in Example 12 except that N-phenyl-2-hydroxynaphthoic acid amide was not used are shown in Table 5.

TABLE 5

|  | Organic Compound | Melt index (g/10 min) | Thermal transformation temperature (°C.) |
|---|---|---|---|
| Example 12 | N—Phenyl-2-hydroxynaphthoic acid amide | 23.4 | 139 |
| Example 13 | N,N'—Diheptanoyl-p-phenylenediamine | 15.1 | 142 |
| Comparative Example 7 | Absence | 9.4 | 144 |

EXAMPLES 14 AND 15

100 parts by weight of polyarylate resin (produced by Unitika Ltd.; U polymer U-100) and a definite amount of N,N'-dibenzoylethylenediamine (melting point: 244° C.) were kneaded by melting at 320° C. for 5 minutes by means of a Brabender plastomill. After completion of kneading, melt index was measured (290° C., load: 20 kg) using a part of it. The other part was molded by a press molding apparatus having a mold temperature of 280° C. After it was cooled to 50° C. over 10 minutes, the molding was taken out from the mold.

A result of measuring thermal transformation temperature of the resulted molding is shown in Table 6.

EXAMPLE 16

Results obtained by the same manner as in Example 14 except that N,N'-diheptanoyl-p-phenylenediamine was used instead of N,N'-dibenzoylethylenediamine are shown in Table 6.

COMPARATIVE EXAMPLE 8

Results obtained by the same manner as in Example 14 except that N,N'-dibenzoylethylenediamine was not used are shown in Table 6.

TABLE 6

|  | Organic Compound | Amount added (part by weight) | Melt index (g/10 min) | Thermal transformation temperature (°C.) |
|---|---|---|---|---|
| Example 14 | N,N'—Dibenzoylethylenediamine | 1 | 10.3 | 166 |
| Example 15 | N,N'—Dibenzoylethylenediamine | 3 | 29.3 | 159 |
| Example 16 | N,N'—Diheptanoyl-p-phenylenediamine | 1 | 12.6 | 165 |
| Comparative Example 8 | Absence | 0 | 3.6 | 169 |

EXAMPLES 17 AND 18

Results obtained by the same manner as in Example 14 except that 100 parts by weight of polyether sulfone resin (produced by I.C.I. Ltd.; trade name: 200P) were used instead of polyarylate resin are shown in Table 7.

EXAMPLE 19

Results obtained by the same manner as in Example 16 except that N,N'-diheptanoyl-p-phenylenediamine was used instead of N,N'-dibenzoylethylenediamine are shown in Table 7.

COMPARATIVE EXAMPLE 9

Results obtained by the same manner as in Example 17 except that N,N'-dibenzoylethylenediamine was not used are shown in Table 7.

TABLE 7

|  | Organic Compound | Amount added (part by weight) | Melt index (g/10 min) | Thermal transformation temperature (°C.) |
|---|---|---|---|---|
| Example 17 | N,N'—Dibenzoylethylenediamine | 1 | 15.2 | 198 |
| Example 18 | N,N'—Dibenzolylethylenediamine | 3 | 29.5 | 195 |
| Example 19 | N,N'—Diheptanoyl-p-phenylenediamine | 3 | 32.5 | 191 |
| Comparative Example 9 | Absence | 0 | 7.0 | 203 |

EXAMPLE 20

Results obtained by the same manner as in Example 14 except that polysulfone resin (produced by Nissan Chemical Co.; trade name: UDEL P1700) was used in an amount of 100 parts by weight instead of polyarylate resin are shown in Table 8.

COMPARATIVE EXAMPLE 10

Results obtained by the same manner as in Example 20 except that N,N'-dibenzoylethylenediamine was not used are shown in Table 8.

TABLE 8

| | Organic Compound | Amount added (part by weight) | Melt index (g/10 min) | Thermal transformation temperature (°C.) |
|---|---|---|---|---|
| Example 20 | N,N'—Dibenzoyl-ethylenediamine | 5 | 54.5 | 161 |
| Comparative Example 10 | Absence | 0 | 19.6 | 171 |

EXAMPLE 21

50 parts by weight of poly-2,6-dimethyl-1,4-phenylene ether (produced by Mitsubishi Petro-Chemical Co.; intrinsic viscosity in chloroform at 25° C: 0.50), 50 parts by weight of high impact styrene (produced by Mitsubishi Petro-Chemical Co.; number average molecular weight: 55,000; weight average molecular weight: 200,000; microgel content: 14.5% by weight) and 5 parts by weight of N,N'-diheptanoyl-p-phenylenediamine represented by the following structural formula:

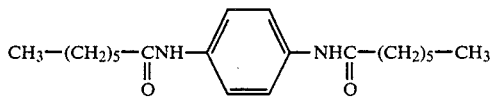

(melting point measured by a melting point tester MP-1 type produced by Yamato Kagaku Co.: 221° C.) were kneaded by melting at 260° C. for 7.5 minutes by means of a Brabender mill.

After completion of kneading, melt index which showed molding property (fluidity) (250° C., load of 10 kg) was measured. On the other hand, a desired test piece was produced by pressing and thermal transformation temperature was measured (load: 18.6 kg/cm²). Results are shown in Table 9.

EXAMPLE 22

Results obtained by the same manner as in Example 21 except that 5 parts by weight of N,N'-dibenzoyl-m-phenylenediamine (melting point: 213° C.) were used instead of N,N'-diheptanoyl-p-phenylenediamine are shown in Table 9.

EXAMPLE 23

Results obtained by the same manner as in Example 21 except that 5 parts by weight of 2,2'-bis(phenylcarbamoyl)-biphenyl represented by the following structural formula

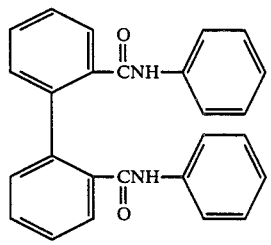

(melting point measured by a melting point tester MP-1 type: 230° C.) are added instead of N,N'-diheptanoyl-p-phenylenediamine are shown in Table 9.

EXAMPLE 24

Results obtained by the same manner as in Example 21 except that 5 parts by weight of N-phenyl-δ-benzoylamino-n-valeramide represented by the following structural formula:

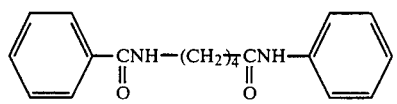

(melting point measured by a melting point tester MP-1 type produced by Yamato Kagaku Co.: 170° C.) were added instead of N,N'-diheptanoyl-p-phenylenediamine are shown in Table 9.

EXAMPLE 25

Results obtained by the same manner as in Example 21 except that 5 parts by weight of diglycolic acid dianilide represented by the following structural formula:

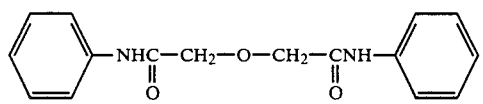

(melting point measured by a melting point tester MP-1 type produced by Yamato Kagaku Co.: 153° C.) were added instead of N,N'-diheptanoyl-p-phenylenediamine are shown in Table 9.

EXAMPLE 26

Results obtained by the same manner as in Example 21 except that 5 parts by weight of sulfonyldiacetic acid di-o-toluidide (melting point: 225° C.) were used instead of diglycolic acid dianilide are shown in Table 9.

EXAMPLE 27

Results obtained by the same manner as in Example 21 except that 5 parts by weight of N-phenyl-3-hydroxy-2-naphthoic acid amide represented by the following structural formula:

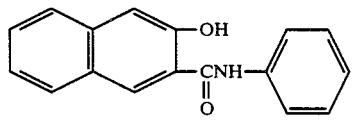

(melting point measured by a melting point tester MP-1 type produced by Yamato Kagaku Co.: 243° C.) were added instead of N,N'-diheptanoyl-p-phenylenediamine are shown in Table 9.

TABLE 9

| | Organic Compound | Melt index (g/10 min) | Thermal transformation temperature (°C.) |
|---|---|---|---|
| Example 21 | N,N'—Diheptanoyl-p-phenylenediamine | 8.3 | 135 |
| Example 22 | N,N'—Dibenzoyl-m-phenylenediamine | 9.5 | 130 |
| Example 23 | 2,2'-Bis(phenylcarbamoyl)biphenyl | 8.3 | 130 |
| Example 24 | N—Phenyl-δ-benzoylamino-n-valeramide | 11.3 | 128 |
| Example 25 | Diglycolic acid dianilide | 6.5 | 133 |
| Example 26 | Sulfonyldiacetic acid di-o-toluidide | 5.9 | 134 |
| Example 27 | N—phenyl-3-hydroxy-2-naphthoic acid amide | 12.1 | 128 |

EXAMPLE 28

50 parts by weight of poly-2,6-dimethyl-1,4-phenylene ether (produced by Mitsubishi Petro-Chemical Co.; intrinsic viscosity in chloroform at 25° C.: 0.50), 50 parts by weight of high impact polystyrene (produced by Mitsubishi Petro-Chemical Co.; number average molecular weight: 55,000; weight average molecular weight: 200,000; microgel content: 14.5% by weight) and 5 parts by weight of 3-hydroxy-2-naphthoic acid represented by the following formula:

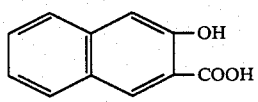

(melting point measured by a melting point tester MP-1 type produced by Yamato Kagaku Co.: 218° C.) were kneaded by melting at 260° C. for 7.5 minutes by means of a Brabender mill.

After completion of kneading, melt index (250° C., load of 10 kg) which showed molding property (fluidity) was measured. On the other hand, a desired test piece was produced and thermal transformation temperature was measured (load: 18.6 Kg/cm²). Results are shown in Table 10.

EXAMPLE 29

Results obtained by the same manner as in Example 28 except that 5 parts by weight of 3,3'-diaminodiphenyl sulfone represented by the following structural formula:

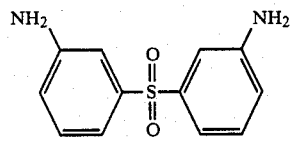

(melting point measured by a melting point tester MP-1 type produced by Yamato Kagaku Co.: 172° C.) were added instead of 3-hydroxy-2-naphthoic acid are shown in Table 10.

TABLE 10

| | Organic Compound | Melt index (g/10 min) | Thermal transformation temperature (°C.) |
|---|---|---|---|
| Example 28 | 3-Hydroxy-2-naphthoic acid | 11.0 | 126 |
| Example 29 | 3,3'-Diaminodiphenyl sulfone | 6.1 | 133 |

While the invention has been described in detail and with reference to specific embodiments thereof, it will be apparent to one skilled in the art that various changes and modifications can be made therein without departing from the spirit and the scope thereof.

What is claimed is:

1. A process for producing a thermoplastic resin molding, which comprises:

heating a composition containing an amorphous thermoplastic resin, having a crystallinity of no more than 20%, as measured by X-ray diffraction under ordinary conditions of use, and having a glass transition temperature of at least 120° C., and an organic compound to a temperature high enough to melt said resin, said organic compound being compatible with said resin in that it forms a homogeneous phase with the molten resin and being able to phase separate from said resin when the resin containing said organic compound is cooled to a solidified state;

molding the molten composition; and cooling said melt, thus achieving phase separation of said organic compound as fine particles within the resin and solidification of the molten resin, said organic compound further being at least one compound selected from the group consisting of compounds represented by formulas:

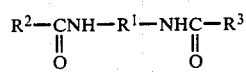

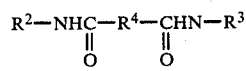

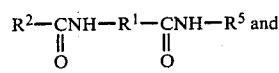 and

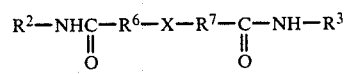

wherein

R$^1$ represents a substituted or unsubstituted, saturated or unsaturated straight chain or branched chain hydrocarbon radical having from 1 to 20 carbon atoms, a substituted or unsubstituted alicyclic hydrocarbon radical having from 3 to 20 carbon atoms, or a substituted or unsubstituted aromatic hydrocarbon radical having from 6 to 20 carbon atoms, R$^2$ and R$^3$ each represent a substituted or unsubstituted aromatic hydrocarbon radical having from 6 to 10 carbon atoms, R$^4$ represents a substituted or unsubstituted saturated or unsaturated, straight chain or branched chain hydrocarbon radical having from 11 to 20 carbon atoms, a substituted or unsubstituted alicyclic hydrocarbon radical having from 11 to 20 carbon atoms, or a substituted or unsubstituted aromatic hydrocarbon radical having from 11 to 20 carbon atoms, $R^5$ represents a substituted or unsubstituted, saturated or unsaturated straight chain or branched chain hydrocarbon radical having from 1 to 10 carbon atoms, a substituted or unsubstituted alicyclic hydrocarbon radical having from 3 to 10 carbon atoms, or a substituted or unsubstituted aromatic hydrocarbon radical having from 6 to 10 carbon atoms, $R^6$ and $R^7$ each represent a substituted or unsubstituted, saturated or unsaturated straight chain or branched chain hydrocarbon radical, a substituted or unsubstituted alicyclic hydrocarbon radical, or a substituted or unsubstituted aromatic hydrocarbon radical, wherein the total of carbon atoms in $R^6$ and $R^7$ is 2 to 10; and —X— represents —O—, —S—, >CO, —COO— or >SO$_2$.

2. The process of claim 1, wherein said thermoplastic resin is a member selected from the group consisting of a polyphenylene ether and a blend of a polyphenylene ether and a styrene resin.

3. The process of claim 1, wherein said organic compound has a melting point of from 150° to 300° C. and is incorporated in said thermoplastic resin in an amount of from 0.1 to 25 parts by weight per 100 parts by weight of the total amount of said thermoplastic resin.

4. The process of claim 1, wherein said organic compound is represented by the formula:

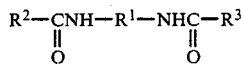

wherein $R^1$-$R^3$ are as defined in claim 1.

5. The process of claim 1, wherein said organic compound is represented by the formula:

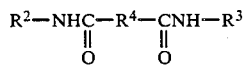

wherein groups $R^2$-$R^4$ are as defined in claim 1.

6. The process of claim 1, wherein said organic compound is represented by the formula:

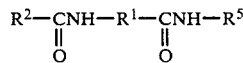

wherein groups $R^1$, $R^2$ and $R^5$ are as defined in claim 1.

7. The process of claim 1, wherein said organic compound is represented by the formula:

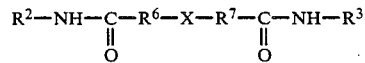

wherein groups $R^2$, $R^3$, $R^6$ and $R^7$ are as defined in claim 1, and —X— represents —O—, —S—, >CO, —COO— or >SO$_2$.

8. The process of claim 1, wherein said thermoplastic resin is polystyrene, high impact polystyrene, a styrene copolymer, polyvinyl chloride, polymethyacrylic acid ester, polyacrylic acid derivatives, a polycarbonate, polynorbornene resin, polyarylate, a polysulfone, a polyether sulfone, polyfluoroethylene, or modified polymers thereof.

9. The process of claim 1, wherein the substituent on the radical which defines groups $R^1$, $R^2$, $R^3$ and $R^5$ is selected from the group consisting of:

—$R^8$, which is a hydrocarbon group having from 1 to 10 carbon atoms,

—X, which is a halogen atom,

—$OR^9$, wherein $R^9$ represents H or a hydrocarbon group having from 1 to 10 carbon atoms, —$NR^{10}R^{11}$, wherein $R^{10}$ and $R^{11}$ each represents H or a hydrocarbon group having from 1 to 10 carbon atoms, —$OCOR^{12}$, wherein $R^{12}$ represents a H or a hydrocarbon group having from 1 to 10 carbon atoms, —$COOR^{13}$, wherein $R^{13}$ represents H or a hydrocarbon group having from 1 to 10 carbon atoms, —$COR^{14}$, wherein $R^{14}$ represents a hydrocarbon group having from 1 to 10 carbon atoms, —$SO_2R^{15}$, wherein $R^{15}$ represents OH or a hydrocarbon group having from 1 to 10 carbon atoms,

—NO$_2$,

—NO, and

—CN.

10. The process of claim 1, wherein the substituent of the group which defines $R^4$ is a hydrogen atom or a hydroxy group.

11. A thermplastic resin molding prepared by a process, comprising:

heating a composition containing an amorphous thermoplastic resin, having a crystallinity of no more than 20%, as measured by X-ray diffraction under ordinary conditions of use, and having a glass transition temperature of at least 120° C., and an organic compound to a temperature high enough to melt said resin, said organic compound being compatible with said resin in that it forms a homogeneous phase with the molten resin and being able to phase separate from said resin when the resin containing said organic compound is cooled to a solidified state;

molding the molten composition; and cooling said melt, thus achieving phase separation of said organic compound as fine particles within the resin and solidification of the molten resin, said organic compound further being at least one compound selected from the group consisting of compounds represented by formulas:

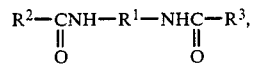

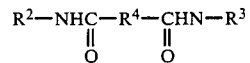

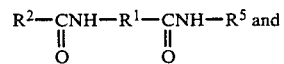

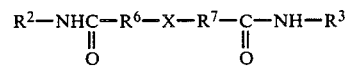

wherein
$R^1$ represents a substituted or unsubstituted, saturated or unsaturated straight chain or branched chain hydrocarbon radical having from 1 to 20 carbon atoms, a substituted or unsubstituted alicyclic hydrocarbon radical having from 3 to 20 carbon atoms, or a substituted or unsubstituted aromatic hydrocarbon radical having from 6 to 20 carbon atoms, $R^2$ and $R^3$ each represent a substituted or unsubstituted aromatic hydrocarbon radical having from 6 to 10 carbon atoms, $R^4$ represents a substituted or unsubstituted saturated or unsaturated, straight chain or branched chain hydrocarbon radical having from 11 to 20 carbon atoms, a substituted or unsubstituted alicyclic hydrocarbon radical having from 11 to 20 carbon atoms, or a substituted or unsubstituted aromatic hydrocarbon radical having from 11 to 20 carbon atoms, $R^5$ represents a substituted or unsubstituted, saturated or unsaturated straight chain or branched chain hydrocarbon radical having from 1 to 10 carbon atoms, a substituted or unsubstituted alicyclic hydrocarbon radical having from 3 to 10 carbon atoms, or a substituted or unsubstituted aromatic hydrocarbon radical having from 6 to 10 carbon atoms, $R^6$ and $R^7$ each represent a substituted or unsubstituted, saturated or unsaturated straight chain or branched chain hydrocarbon radical, a substituted or unsubstituted alicyclic hydrocarbon radical, or a substituted or unsubstituted aromatic hydrocarbon radical, wherein the total of carbon atoms in $R^6$ and $R^7$ is 2 to 10; and —X— represents —O—, —S—, >CO, —COO— or >SO$_2$.

12. The thermoplastic resin molding of claim 11, wherein said organic compound is represented by the formula:

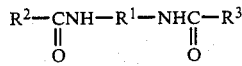

wherein $R^1$-$R^3$ are as defined in claim 11.

13. The thermoplastic resin molding of claim 11, wheein said organic compound is represented by the formula:

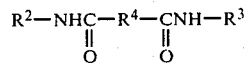

wherein groups $R^2$-$R^4$ are as defined in claim 11.

14. The thermoplastic resin molding of claim 11, wherein said organic compound is represented by the formula:

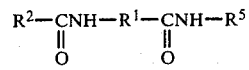

wherein groups $R^1$, $R^2$ and $R^5$ are as defined in claim 11.

15. The thermoplastic resin molding of claim 11, wherein the substituent on the radical which defines groups $R^1$, $R^2$, $R^3$ and $R^5$ is selected from the group consisting of:
— $R^8$, which is a hydrocarbon group having from 1 to 10 carbon atoms,
— X, which is a halogen atom,
— $OR^9$, wherein $R^9$ represents H or a hydrocarbon group having from 1 to 10 carbon atoms,
— $NR^{10}R^{11}$, wherein $R^{10}$ and $R^{11}$ each represents H or a hydrocarbon group having from 1 to 10 carbon atoms,
— $OCOR^{12}$, wherein $R^{12}$ represents a H or a hydrocarbon group having from 1 to 10 carbon atoms,
— $COOR^{13}$, wherein $R^{13}$ represents H or a hydrocarbon group having from 1 to 10 carbon atoms,
— $COR^{14}$, wherein $R^{14}$ represents a hydrocarbon group having from 1 to 10 carbon atoms,
— $SO_2R^{15}$, wherein $R^{15}$ represents OH or a hydrocarbon group having from 1 to 10 carbon atoms,
— $NO_2$,
— NO, and
— CN.

16. The thermoplastic resin molding of claim 11, wherein the substituent of the group which defines $R^4$ is a hydrogen atom or a hydroxy group.

* * * * *